United States Patent
Andre et al.

(10) Patent No.: US 10,624,173 B2
(45) Date of Patent: Apr. 14, 2020

(54) INVISIBLE, LIGHT-TRANSMISSIVE DISPLAY SYSTEM

(71) Applicant: Apple Inc., Cupertino, CA (US)

(72) Inventors: Bartley K. Andre, Menlo Park, CA (US); Daniel Coster, San Francisco, CA (US); Richard Howarth, San Francisco, CA (US); Daniele de Iuliis, San Francisco, CA (US); Jonathan P. Ive, San Francisco, CA (US); Duncan Kerr, San Francisco, CA (US); Jivan Kumar Khosla, Cupertino, CA (US); Shin Nishibori, Kailua, HI (US); Matthew Rohrbach, San Francisco, CA (US); Doug B. Satzger, Menlo Park, CA (US); Calvin Seid, Palo Alto, CA (US); Christopher Stringer, Portola Valley, CA (US); Eugene Whang, San Francisco, CA (US); Rico Zorkendorfer, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 16/038,092

(22) Filed: Jul. 17, 2018

(65) Prior Publication Data

US 2018/0324927 A1    Nov. 8, 2018

Related U.S. Application Data

(63) Continuation of application No. 15/181,901, filed on Jun. 14, 2016, now Pat. No. 10,034,349, which is a
(Continued)

(51) Int. Cl.
H05B 37/02  (2006.01)
H01H 13/83  (2006.01)
(Continued)

(52) U.S. Cl.
CPC ....... *H05B 37/0209* (2013.01); *F21V 23/003* (2013.01); *F21V 33/0052* (2013.01);
(Continued)

(58) Field of Classification Search
CPC ..... H05B 37/0209; G08B 5/36; G06F 1/1616; G06F 1/1662; G06F 1/1635;
(Continued)

(56) References Cited

U.S. PATENT DOCUMENTS

| 3,705,771 A | 12/1972 | Friedman et al. |
| 5,210,967 A | 5/1993 | Brown |

(Continued)

FOREIGN PATENT DOCUMENTS

| JP | 07271309 | 10/1995 |
| WO | 2004077388 | 9/2004 |
| WO | 2008006375 | 1/2008 |

OTHER PUBLICATIONS

Prichystal, et al., "Invisible Display in Aluminum" in Proc. of SPIE vol. 5713: Photon Processing in Microelectronics and Photonic IV, Jan. 2005, pp. 215-222.

(Continued)

*Primary Examiner* — Seung C Sohn
(74) *Attorney, Agent, or Firm* — Treyz Law Group, P.C.; G. Victor Treyz; Michael H. Lyons (57) ABSTRACT

An invisible, light-transmissive display system with a light resistant material is provided. Substantially invisible holes penetrate through at least a portion of the light resistant material in a predetermined light-transmissive display pattern.

20 Claims, 6 Drawing Sheets

Related U.S. Application Data continuation of application No. 14/280,987, filed on May 19, 2014, now Pat. No. 9,377,821, which is a continuation of application No. 12/973,627, filed on Dec. 20, 2010, now Pat. No. 8,735,800, which is a continuation of application No. 11/456,833, filed on Jul. 11, 2006, now Pat. No. 7,884,315.

(51) Int. Cl.
*G09F 13/08* (2006.01)
*G08B 5/36* (2006.01)
*G09F 9/30* (2006.01)
*G09F 13/04* (2006.01)
*G09F 13/06* (2006.01)
*G06F 1/16* (2006.01)
*F21V 23/00* (2015.01)
*F21V 33/00* (2006.01)
*F21W 111/10* (2006.01)

(52) U.S. Cl.
CPC ........ *F21V 33/0056* (2013.01); *G06F 1/1616* (2013.01); *G06F 1/1635* (2013.01); *G06F 1/1662* (2013.01); *G08B 5/36* (2013.01); *G09F 9/30* (2013.01); *G09F 13/04* (2013.01); *G09F 13/06* (2013.01); *G09F 13/08* (2013.01); *H01H 13/83* (2013.01); *F21W 2111/10* (2013.01); *Y10T 29/49* (2015.01)

(58) Field of Classification Search
CPC ............. F21V 33/0056; F21V 33/0052; F21V 23/003; H01H 13/83; G09F 13/06; G09F 13/08; G09F 13/04; G09F 9/30; F21W 2111/10; Y10T 29/49
USPC .................................................. 250/227.26
See application file for complete search history.

(56) References Cited

U.S. PATENT DOCUMENTS

| | | | |
|---|---|---|---|
| 5,544,020 A | 8/1996 | Loeber et al. | |
| 5,987,793 A | 11/1999 | Ebine | |
| 6,166,496 A * | 12/2000 | Lys | H05B 33/0857 315/292 |
| 7,334,362 B2 | 2/2008 | Bladt | |
| 7,336,339 B2 * | 2/2008 | Ho | G09F 9/33 313/512 |
| 7,663,612 B2 | 2/2010 | Bladt | |
| 2004/0247935 A1 | 12/2004 | Bladt | |
| 2006/0066579 A1 | 3/2006 | Bladt | |

OTHER PUBLICATIONS

Liu et al., "Industrial applications of ultrahigh precision short-pulse laser processing" in Proc of SPIE vol. 5713: Photon Processing in Microelectronics and Photonics IV, Jan. 2005, pp. 372-286.

Tyyrell, J., "Invisible display lights up metal," Lasers, Optics and Photonics Resources and News, Feb. 17, 2005, pp. 1-2.

\* cited by examiner

INVISIBLE, LIGHT-TRANSMISSIVE DISPLAY SYSTEM

This application is a continuation of U.S. patent application Ser. No. 15/181,901, filed Jun. 14, 2016, which is a continuation of U.S. patent application Ser. No. 14/280,987, filed May 19, 2014, which is a continuation of U.S. patent application Ser. No. 12/973,627, now U.S. Pat. No. 8,735,800, filed Dec. 20, 2010, which is a continuation of U.S. patent application Ser. No. 11/456,833, now U.S. Pat. No. 7,884,315, filed Jul. 11, 2006, which are hereby incorporated by reference herein in their entireties.

TECHNICAL FIELD

The present invention relates generally to device display systems, and more particularly to invisible, light-transmissive display systems that become visible when illuminated from behind.

BACKGROUND ART

In the world, of consumer devices, and, particularly consumer electronics, there is an ever-present demand for improved appearance, improved functionality, and improved aesthetics. Industrial design has become a highly skilled profession that focuses on fulfilling this need for enhanced consumer product appearance, functionality, and aesthetics.

One area that continually receives great attention for improvement is user displays. Providing crisp, attractive, unambiguous, and intuitively friendly displays and information for the user is very important in many consumer products. However, as consumer products constantly become smaller and smaller, and in some cases more and more complex, it becomes increasingly difficult to present and display user information in a manner that is easy for the user to grasp and understand, but is also in an uncluttered form and appearance that is aesthetically pleasing.

Much of the aesthetic appeal of a consumer product can quickly be compromised if there are too many display elements, or if too much display area is occupied by display elements that are not needed except at particular times. When not needed, these "passive" or unactivated display elements invariably remain visible to the user, even though in the "off" state. This is not only displeasing from an aesthetic standpoint, but it can be an annoying distraction that interferes with detection and understanding of other display elements that need to be observed at a given moment.

Many display elements are illuminated. Some display elements are illuminated continuously; others are illuminated only when appropriate to instruct and guide the user. Display elements that are not continuously illuminated can be distracting, or at least aesthetically objectionable, when not illuminated (when in the off state) because they still remain visible in the display area.

For example, one typical such display element is configured from transparent plastic inserts that penetrate through the metallic case of an electronic device, and are smoothly flush with the outer surface of the case. Oftentimes, a large number of such always-visible display elements leads to a cluttered, confusing, and unattractive appearance. In fact, even a single such element, when not illuminated (i.e., in an inactive state), can become an unattractive blotch on an otherwise smooth and attractive surface.

Less expensive device cases, for example, those made of opaque plastic rather than metal, are often similarly provided with transparent plastic inserts for illuminated display elements. These display elements also conflict with a good aesthetic appearance when they are not illuminated.

Also, prior displays using plastic or glass are less durable than metal and are more subject to breaking or cracking.

Additionally, the separate visible inserts utilized by prior techniques sometimes do not fit perfectly in the holes in which they are inserted or formed. Such imperfect fit can invite entry of liquids, dirt, and so forth, undesirably causing yet another disadvantage.

Thus, a need still remains for commercially feasible device display systems with improved aesthetics that unobtrusively furnish information as appropriate but otherwise do not distract or detract from the user's experience or the device's performance. Preferably, selected elements of such display systems would additionally become invisible in their off states.

In view of ever-increasing commercial competitive pressures, increasing consumer expectations, and diminishing opportunities for meaningful product differentiation in the marketplace, it is increasingly critical that answers be found to these problems. Moreover, the ever-increasing need to save costs, improve efficiencies, improve performance, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides an invisible, light-transmissive display system with a light resistant material. Substantially invisible holes penetrate through at least a portion of the light resistant material in a predetermined light-transmissive display pattern.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs.

Similarly, although the views in the drawings for ease of description generally show similar orientations, this depiction in the FIGs. is arbitrary for the most part. Generally, the invention can be operated in any orientation. In addition, where multiple embodiments are disclosed and described having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the display, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

Figure 1:
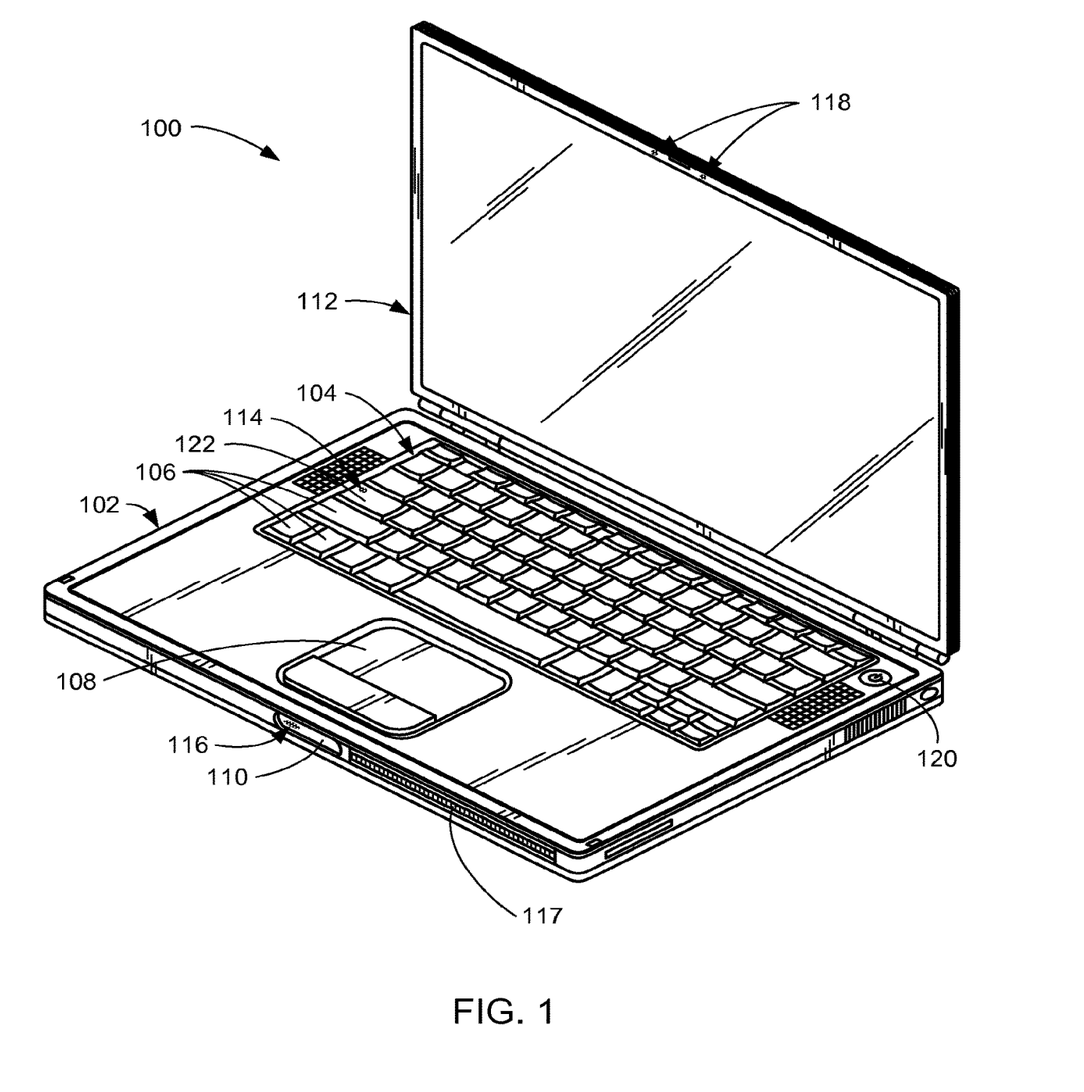
FIG. 1 is a view of a portable computer incorporating an invisible, light-transmissive display system according to the present invention.

Referring now to FIG. 1, therein is shown a portable computer 100 having a housing base 102 that supports a keyboard 104 having keys 106, a touchpad 108, a release latch 110, and so forth. The housing base 102 also supports conventional components (not shown) such as a power supply, a microprocessor ("CPU"), a computer memory, a hard drive ("HD"), an optical disk drive ("ODD"), and so forth. A display 112 is hingedly attached to the housing base 102, and when closed is retained in place by the release latch 110.

The portable computer 100 has several status indicators according to the present invention, as will be described in further detail below. These status indicators include, for example, a caps lock indicator 114, a sleep indicator 116, status indicators 118, a power button 120, and so forth. The caps lock indicator 114 is located in the caps lock key 122 of the keyboard 104 to indicate when the caps lock function of the keyboard 104 has been engaged. The sleep indicator 116 is located in the release latch 110 to indicate when the portable computer 100 has been engaged in a sleep mode. The status indicators 118 may be used to provide information concerning the status of any function or activity assigned thereto, for example, wireless link status, video camera status, low battery, battery charging, hard drive activity, and so forth. Similarly, the power button 120 can be illuminated to indicate that the computer is powered on, or may be illuminated upon opening the display 112 to assist in locating the power button 120, and so forth.

In prior computer configurations and designs, these various status indicators are ordinarily visible to the user in both the activated (or "on") and the inactivated (or "off") states. In the on state, an indicator will characteristically be illuminated continuously or periodically (e.g., cyclically), sometimes with a particular informational color according to the status that the indicator is reporting. In the off state, the indicator will typically be darkened (inactivated or unilluminated), but unfortunately (in many circumstances) can nonetheless still be seen. In the off state, therefore, the indicator often distracts and/or spoils the aesthetics of the portable computer 100.

In contrast, it is believed that a majority of consumers would find the portable computer 100 to be more attractive if status indicators of this sort became invisible in the off state. Of course, it will also be appreciated that there are other circumstances in which an indicator, such as a logo, would preferably remain visible even when in the off state, and circumstances of that sort are also addressed hereinbelow.

Concerning status indicators that would ideally not be visible (i.e., would disappear) in the off state, a principal difficulty faced by previous techniques is that such status indicators are ordinarily located in a partially or completely opaque display surface area. For the status indicator to function, therefore, the surface is interrupted at the status indicator location so that the light from the status indicator can be externally visible to the user. The consequent visible discontinuity in the appearance of the surface is therefore always visible to the user, whether the indicator is on or off.

There have been previous efforts to reduce or eliminate the visibility of such status indicators when in the off state. One such prior technique preserves the integrity of the display surface by reducing the thickness of a metallic display panel from the rear in the region or area of the status indictor. The thickness is reduced until the metallic display panel actually becomes light-transmissive. When light is then shined on the rear or back side of the metallic display panel, it passes through that region and becomes visible on the opposite (outer or front) side of the metallic display panel. Thus, by thinning the metal only from the back side, the opposite side of the metallic display panel remains smooth, untouched, and uninterrupted. As such, the status indicator region in the off or unilluminated state cannot be distinguished and is invisible from the unmodified outside surface of the metallic sheet.

In one implementation of this technique, a matrix of holes was formed from and into one side (e.g., the "back side") of a metal sheet nearly to the surface of the other side (e.g., the "front side"). For example, using laser ablation on an aluminum sheet, the holes were formed from the back side of the metallic aluminum sheet until there was a thickness of metal remaining at the front side on the order of only 12-20 nm. The matrix of holes was configured in the shape of a desired indicator, such as an arrow. The very small thickness of metal remaining at the end of each hole at the front surface of the metallic aluminum sheet allowed light to pass outwardly through the front surface of the sheet when the light was shined into the holes from the back surface thereof.

Unfortunately, such a reduced metallic thickness technique is very expensive due to the extreme precision required for the laser ablation (e.g., using a femtosecond laser) and the need for metallic sheets having a very even thickness and very even and flat surfaces. The need to have a perfectly flat metallic sheet can be somewhat mitigated by using a camera or other light-detecting device that is directed at the front surface of the metallic sheet in the vicinity where the holes are being laser-drilled from the back side of the sheet. The camera then detects light from the laser just as the remaining metal at the end of the hole becomes light transmissive. Upon detecting the desired intensity of light from the laser, the laser drilling process can then be terminated. However, this is a sensitive process and is very expensive.

Such reduced metallic thickness, light-through-metal status indicators are also fragile due to the very thin, easily damaged metallic membranes at the ends of the holes at the front surface of the metallic sheet.

Another disadvantage is that the amount of light transmitted is very small. For example, at 22 nm thickness of aluminum, only about one percent of the light is transmitted; at 12 nm approximately six percent is transmitted. Thus, intense illumination is needed on the back side of the metallic sheet to provide an acceptably visible status indication on the front surface.

The systems of the present invention overcome the numerous disadvantages of previous techniques. They also provide new versatility, options, and capabilities not achievable with previous techniques.

Figure 2A:
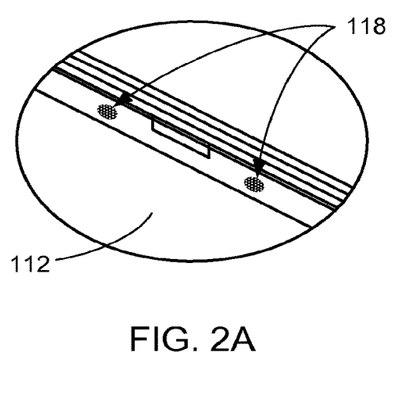
FIG. 2A is an enlarged detail from FIG. 1 of status indicators shown in an illuminated state.

Referring now to FIG. 2A, therein is shown an enlarged detail from FIG. 1 of the status indicators 118 according to the present invention. The status indicators 118 are illustrated in the on or illuminated and visible state.

Figure 2B:
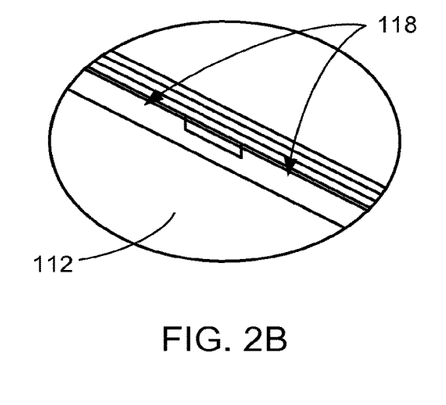
FIG. 2B is a view similar to FIG. 2A in which the status indicators are in an unilluminated state.

Referring now to FIG. 2B, therein is shown a view similar to FIG. 2A in which the status indicators 118 are in the off or unilluminated state. As can be seen, the status indicators 118 in the off state have become invisible. The surface of the display 112 in which the status indicators 118 are located is smooth, continuous, uncluttered, and uninterrupted.

Figure 3A:
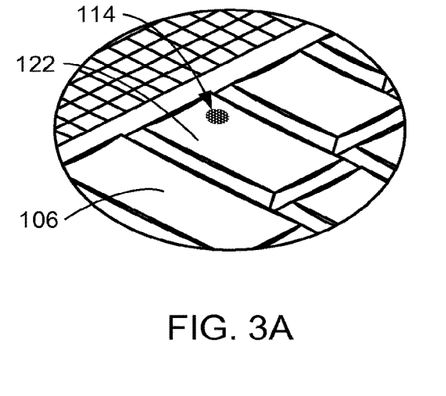
FIG. 3A is an enlarged detail from FIG. 1 of the caps lock indicator shown in an illuminated state.

Referring now to FIG. 3A, therein is shown an enlarged detail from FIG. 1 of the caps lock indicator 114 according to the present invention. The caps lock indicator 114 is illustrated in the on or illuminated and visible state.

Figure 3B:
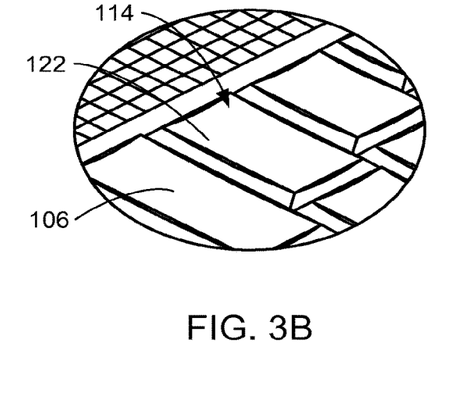
FIG. 3B is a view similar to FIG. 3A in which the caps lock indicator is in an unilluminated state.

Referring now to FIG. 3B, therein is shown a view similar to FIG. 3A in which the caps lock indicator 114 is in the off or unilluminated state. As can be seen, the caps lock indicator 114 in the off state has become invisible. The surface of the caps lock key 122 in which the caps lock indicator 114 is located is smooth, continuous, uncluttered, and uninterrupted.

Figure 4A:
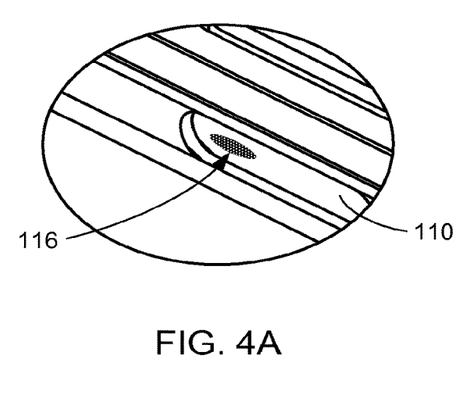
FIG. 4A is an enlarged detail from FIG. 1 of the sleep indicator shown in an illuminated state.

Referring now to FIG. 4A, therein is shown an enlarged detail from FIG. 1 of the sleep indicator 116 according to the present invention. The sleep indicator 116 is illustrated in the on or illuminated and visible state.

Figure 4B:
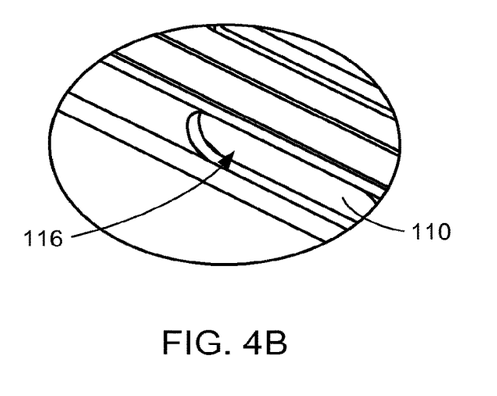
FIG. 4B is a view similar to FIG. 4A in which the sleep indicator is in an unilluminated state.

Referring now to FIG. 4B, therein is shown a view similar to FIG. 4A in which the sleep indicator 116 is in the off or unilluminated state. As can be seen, the sleep indicator 116 in the off state has become invisible. The surface of the release latch 110 in which the sleep indicator 116 is located is smooth, continuous, uncluttered, and uninterrupted.

The status indicators 118, the caps lock indicator 114, the sleep indicator 116, and other desired display patterns that disappear in the off state, form "ghosted field" display patterns that appear and disappear (like ghosts) when tamed on and off. As explained in greater detail hereinbelow, such invisible, light-transmissive display systems can be provided for viewing at an outer surface of a light resistant material. Such a light resistant material may be, for example, a substantially opaque material such as metal, or a light-absorbing but translucent material such as colored plastic, or a coated or painted material, or material of other appropriate composition and configuration. As used herein, therefore, "light resistant" refers to some degree of light attenuation, up to and including complete opacity.

Invisible holes are then penetrated in one or more desired light-transmissive display patterns through at least a portion of the light resistant material to provide the ghosted field display patterns.

Figures 5A, 5B, 6A, 6B:
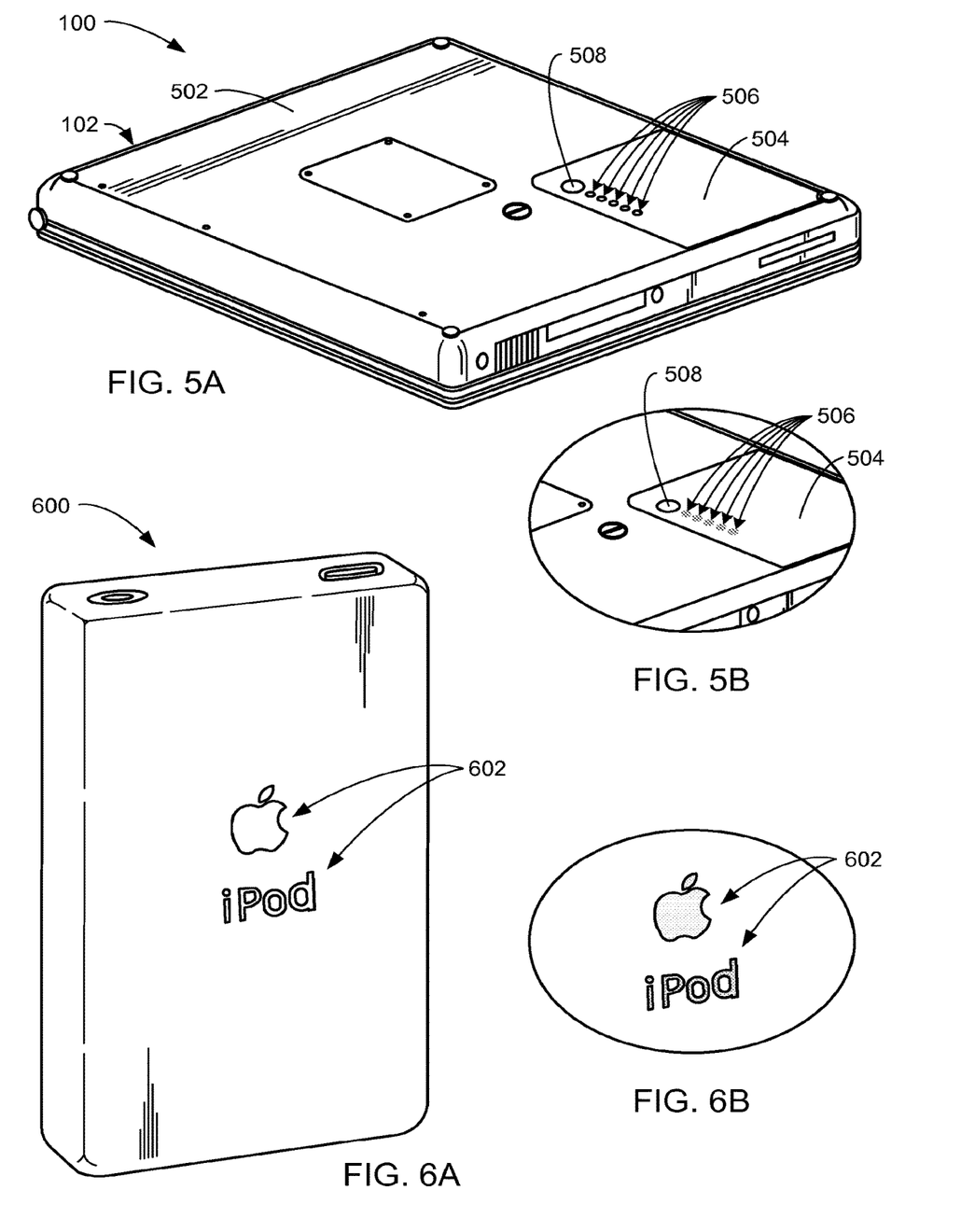
FIG. 5A is a bottom view of the portable computer of FIG. 1.
FIG. 5B is a view similar to FIG. 5A in which the battery status indicator lights are in an unilluminated state.
FIG. 6A is a view of a personal music player with a surface logo in an illuminated state.
FIG. 6B is a detail from 6A showing the logo in an unilluminated state.

Referring now to FIG. 5A, therein is shown a bottom view of the portable computer 100 of FIG. 1. Accessible on the bottom 502 of the portable computer 100 is a battery pack 504 having battery status indicator lights 506. In one embodiment, for example, a test button 508 on the battery pack 504 can be actuated to cause the battery status indicator lights 506 to illuminate according to the charge state of the battery pack 504. The more battery status indicator lights 506 that illuminate, the higher the charge level of the battery pack 504. FIG. 5A illustrates the indicator state in which all five of the battery status indicator lights 506 are illuminated, showing a fully charged battery.

Referring now to FIG. 5B, therein is shown a detail from FIG. 5A in which the battery status indicator lights 506 are in the off or unilluminated state. However, although the battery status indicator lights 506 are off, they have not become invisible. Rather, in some situations, it may be desirable for a status indicator to remain at least partially visible when in the off state. For example, the battery status indicator lights 506 number five such indicators. Sometimes, actuation of the test button 508 will cause only some (or none) of the battery status indicator lights 506 to illuminate, thereby indicating a corresponding partially charged (or discharged) state for the battery pack 504. In such a case, it can be desirable for the remaining battery status indicator lights 506 that are in the off state to be visible so that the user can easily see what proportion is illuminated. Thus, as illustrated in FIG. 5B, the battery status indicator lights 506 are all in the off state but remain visible.

The persistent visibility for the battery status indicator lights 506 (or any other desired status indicators) when in the off state may be achieved, for example, by providing a different surface treatment on the surface where the status indicators are located, or, for example, heating the surface during formation of the status indicators sufficiently to discolor or even slightly burn the surface, to achieve the desired effect. Or, the surface may be colored such as by application of a paint, color, or dye in the desired pattern. Alternatively, or in addition, the status indicator through-the-surface light-conducting invisible holes (as explained below starting with the description of FIG. 7) may include additional holes of visible size and/or include clear coat formulations that contrast with the surface where the status indicators are located. In this way, the locations and states of the indicators are always visible, even though the principle means by which the light is actually able to emanate from the display surface (i.e., the invisible holes) cannot be seen.

Referring now to FIG. 6A, therein is shown a personal music player 600. A logo 602 is provided as an intrinsic, visible design on a surface of the personal music player 600, and is shown in the on (illuminated) state. Utilizing the invisible hole technology of the present invention (explained further hereinbelow), the light from the logo 602 emanates from the surface of the personal music player 600 with no visible source. To the unaided eye, the surface of the logo appears continuous, solid, metallic, and seemingly incapable of transmitting light. This continuous, uninterrupted and unblemished surface, which nevertheless emits light, is accordingly particularly aesthetically appealing.

Referring now to FIG. 6B, therein is shown a detail from FIG. 6A showing the logo 602 in the off (unilluminated) state. Unlike the status indicators of the present invention that disappear in the off state (e.g., the status indicators 118 (FIG. 2B), the caps lock indicator 114 (FIG. 3B), and the sleep indicator 116 (FIG. 4B)), the logo 602, as depicted in FIG. 6B, remains visible in the off state (like the battery status indicator lights 506 (FIG. 5B)). Accordingly, depending upon the implementation of the present invention (as detailed more particularly hereinbelow), a wide variety of effects and treatments can be provided as desired. Thus, as depicted in FIG. 6B, the unilluminated logo 602 may be configured to appear as a logo that is etched into a solid metallic surface. Then, upon illumination of the logo 602 from behind, light emanates from the seemingly solid metallic surface of the logo 602, as depicted in FIG. 6A, realizing a particularly attractive and dramatic effect.

Figure 7:
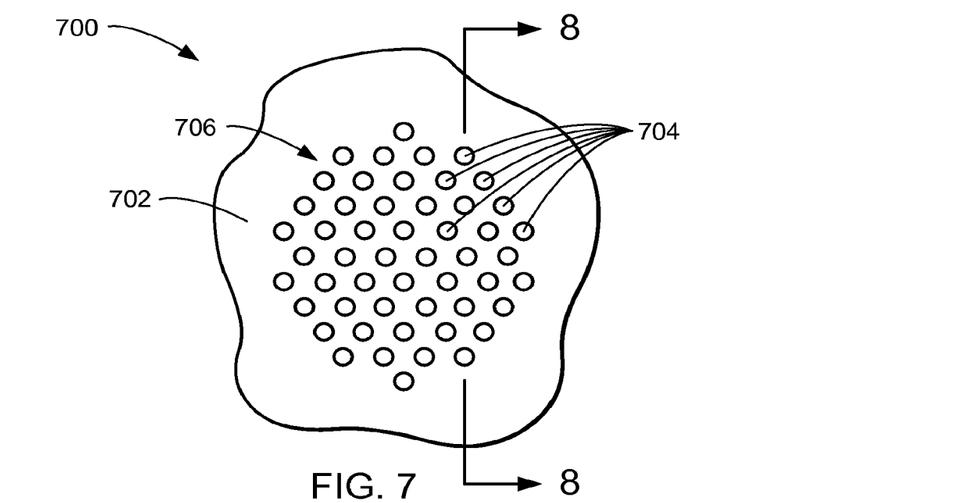
FIG. 7 is an enlarged view of a fragment of light resistant material having an opaque outer surface and incorporating an invisible, light-transmissive display system according to the present invention.

Referring now to FIG. 7, therein is shown an enlarged view of a fragment 700 of light resistant material having an opaque outer surface 702 according to an embodiment of the present invention. In one embodiment, the opaque outer surface 702 is the outer surface of a metallic sheet of aluminum. Holes 704 are formed in and penetrate through the opaque outer surface 702 to the opposite or inner side (i.e., the rear surface 804 shown in FIG. 8) of the fragment 700.

The holes 704, although shown greatly exaggerated in the drawing FIGs., are actually invisible. That is, each of the holes 704 is smaller than resolvable by an unaided human eye. For example, the limit of resolution for the human eye is about 0.1 mm at a distance from the eye of 1 meter. In children, the resolution might be somewhat finer, for example, 0.04 mm. Thus, depending upon the anticipated viewer and viewing distance, the holes 704 will be selected to be below the limit of resolution, and it will accordingly be understood that the term "invisible hole" refers to this upper limit. Thus, as defined herein, "invisible holes" refers to holes that are smaller than resolvable by an unaided human eye.

Conversely, it will be understood that the term "visible holes" refers to holes that are large enough to be resolvable by an unaided human eye.

As depicted in FIG. 7, the holes 704 are arranged in a pattern 706 that forms a status indicator shaped as a circle or dot. For expository reasons, just as the holes 704 are shown greatly exaggerated in size, so also is the size of the pattern 706 greatly exaggerated. Typically, however, the pattern 706 will be large enough to be seen (when illuminated) by the unaided human eye—such as of the size of conventional status indicators.

In one embodiment in which the holes 704 are utilized to form status indicators for a portable computer such as the portable computer 100 (FIG. 1), the holes 704 have a diameter of 0.02 mm. Spacings between the holes 704 are a distance of 0.18 mm. The size of the status indicator pattern itself (e.g., the pattern 706) varies from a fraction of a mm to several mm across, depending upon the actual pattern that is depicted.

Figure 8:
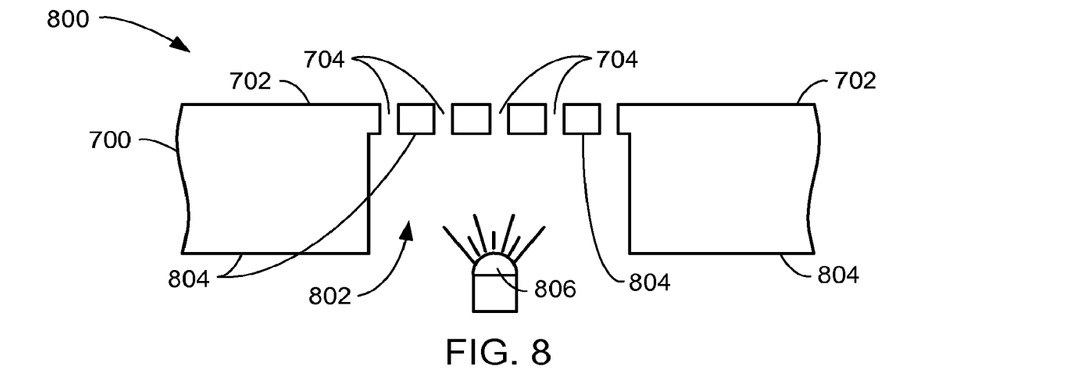
FIG. 8 is a cross-sectional view of the fragment shown in FIG. 7.

Referring now to FIG. 8, therein is shown a cross-sectional view 800 of the fragment 700, taken on line 8-8 in FIG. 7. In this embodiment, formation of the holes 704 is facilitated by forming a cavity 802 in the rear surface 804 of the fragment 700. The cavity 802 is thus opposite the opaque outer surface 702 for the pattern 706 (FIG. 7) status indicator. Advantageously, the cavity 802 significantly reduces the amount of drilling that must be performed to form the holes 704 through the opaque outer surface 702.

A light source such as a light 806 is located opposite or within the cavity 802 and configured for providing light to be transmitted through the holes 704 when the pattern 706 status indicator is actuated to the on state.

It will be appreciated, of course, that in certain situations the cavity 802 can be advantageous, while in others it may not improve overall manufacturing efficiency or speed. For example, when the fragment 700 is not particularly thick (e.g., on the order of up to 0.7 mm or so of aluminum), the additional time for laser drilling a pattern of holes such as the holes 704 may increase by only a few seconds to less than a minute. In such a case, it may be more efficient and economical to omit the cost and delay associated with first forming the cavity 802.

Figure 9:
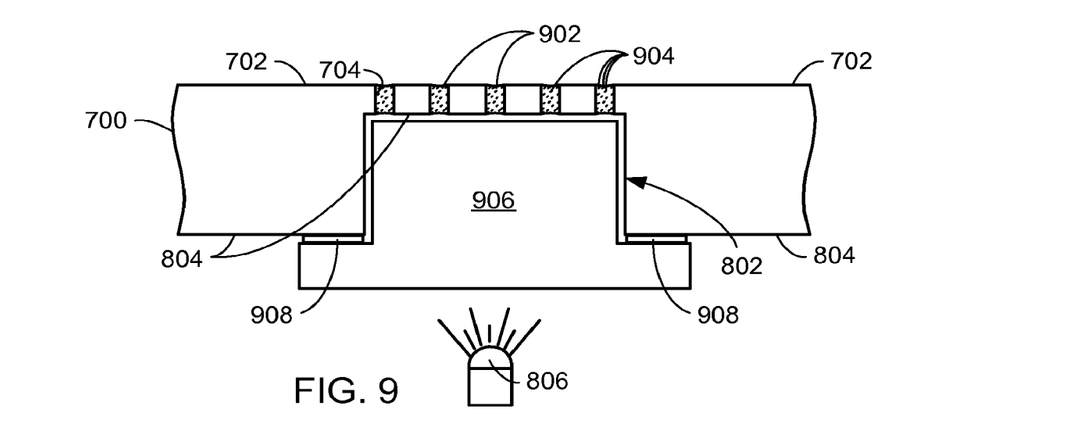
FIG. 9 is a view of the structure of FIG. 8 following application of a particle-containing clear coat into the holes thereof.

Referring now to FIG. 9, therein is shown the structure of FIG. 8 following application of a clear coat 902 into the holes 704. The clear coat 902 may be any suitable clear or translucent coating or material, such as a clear paint, that functions as a light-conductive filler. Depending upon the particular application and configuration at hand, such a clear coat 902 may be water based and cured by water evaporation, or polymer based and cured by ultraviolet ("UV") light, heat curable, and so forth, as is known in the liquid coating arts.

The clear coat 902 is selected to wet the surface of the holes 704 appropriately for the material in which the holes 704 are formed. In one embodiment, a UV curable clear coat 902 having a viscosity (when liquid) matched to the dimensions and materials of the holes 704 was painted or sprayed upon the opaque outer surface 702, allowing the natural surface tension properties and capillary action of the clear coat liquid to draw the clear coat 902 into the holes 704. Thereafter, the clear coat 902 was appropriately cured. Depending upon the circumstances of the particular application in which the present invention is being utilized, the clear coat 902 may be applied from the opaque outer surface 702, the rear surface 804, or both surfaces.

It has been discovered that the clear coat 902 provides several aspects. For example, it closes and seals off the holes 704, protecting them from ingress of dirt, oil, and other contaminants that might degrade the light transmissivity thereof. The outer surface is thus secured in case of exposure to contamination.

The clear coat 902 can also be modified or adjusted to provide desired effects concerning the light that is being transmitted through the holes 704. For example, the clear coat 902 may be provided with a desired color, such as by incorporating a corresponding color, dye, or fluorescent dye thereinto. Alternatively or additionally, particles 904 may be provided or incorporated into the clear coat 902. Such particles may also be colored to provide various desired effects with regard to the color qualities of the light issuing from the holes 704. These particles may include, for example, nano-size reflective metallic particles, silicon particles, mica particles, fluorescent particles, and so forth. Such particles 904 are advantageous, for example, when it is desired to disperse the light emanating from the holes 704 over a wider viewing angle. Conversely, due to the collimating effect of the holes 704 upon the light from the light 806, the visibility of the light emanating from the holes 704 can be advantageously restricted to a narrow viewing angle nearly perpendicular to the opaque outer surface 702 by using a clear coat 902 that does not contain light scattering elements, but may still include one or more colors or dyes if desired.

Examples of light-conducting clear coats 902 used as fillers for the micro-perforated holes 704 penetrated through aluminum plates are in the table below. The aluminum plates were anodized aluminum measuring 7 inches×4 inches×4 mm. Small, medium, and large holes, ranging in size from 20 µm to 60 µm, were penetrated through the plates and filled with clear coat applied from the inner surfaces of the plates. The first set of holes received just a clear coat; the second a clear coat containing 2% fluorescent pigment; the third a clear coat containing 2% silicon particles of nano size.

The clear coats were applied on top of the holes by small brushes (thereby causing the clear coats to have the characteristics of having been brushed into the invisible holes), and just enough time was allowed to let the clear coats penetrate and flow to the outer (or front) surfaces of the aluminum plates, following which the clear coats were UV cured. The clear coat penetration times were determined by experimentation. It was discovered that hole penetration times could be normalized by using and correlating higher clear coat viscosities on larger holes and corresponding lower viscosities on smaller holes.

Following satisfactory penetration, the aluminum plates were passed into a UV curing oven in which both sides of the plates were cured. The UV energy used was 72 milli-Joules for two curing cycles of 10 seconds each.

| Hole diameter | Clear coat | Viscosity (millipoise) time at 25° C. | Penetration time in seconds | UV Curing in seconds |
| --- | --- | --- | --- | --- |
| 20 µM | Urethane Oligomer Epont Cure 2000-101-A | 2600 | 20 | 2 × 10 |
| 30 µM | Urethane Oligomer Epont Cure 2000-101-A | 2600 | 10 | 2 × 10 |
| 8O µM | Urethane Oligomer Epont Cure 2000-100-A | 5800 | 8 | 2 × 10 |
| 20 µM | 2000-101-A + 2% Flouroscent | 2600 | 25 | 2 × 10 |
| 30 µM | 2000-101-A + 2% Flouroscent | 2600 | 12 | 2 × 10 |
| 80 µM | 2000-100-A + 2% Flouroscent | 5800 | 10 | 2 × 10 |
| 20 µM | 2000-101-A + 2% Si Nano | 2600 | 25 | 2 × 10 |
| 30 µM | 2000-101-A + 2% Si Nano | 2600 | 12 | 2 × 10 |
| 80 µM | 2000-100-A + 2% Si Nano | 5800 | 10 | 2 × 10 |

Following completion of the hole filling process, a light source was shined on the back surface of each aluminum plate. The light source showed that the larger holes were brighter than the smaller ones. At a viewing angle of about 15 degrees, the light transmitted was also brighter with the clear coats that had a fluorescent pigment, a little less bright with the clear coats that had nano particles, and even less bright with the clear coat only. Thus, the fluorescent pigment and the nano particles both helped to increase the angle and the intensity of the transmitted light. Additionally, the clear coats scaled the holes to prevent dirt and contaminants from entering the holes.

Referring again to FIG. 9, when the fragment 700 is optionally provided with the cavity 802, a structural plug 906 (for example of clear plastic) may then be inserted into the cavity 802. A suitable adhesive or an adhesive tape 908 may be used to secure the structural plug 906 in the cavity 802. The structural plug 906 then provides structural reinforcement at the rear of the holes 704. This additional structural reinforcement can be advantageous because of the reduced thickness and structural strength of the fragment 700 in the vicinity of the holes 704, and because of the further reduction in strength caused by the holes 704 themselves. The structural plug 906 thus reduces the likelihood of damage to the indicator or logo (as the case may be) that is formed by the pattern of the holes 704, should force be inadvertently applied thereto from the outside.

As illustrated in FIG. 9, the structural plug 906 conforms substantially to the dimensions of the cavity 802, with perhaps a slight clearance or gap therebetween for ease of assembly. The clearance or gap shown in FIG. 9 is exaggerated for clarity of illustration.

In view of the teachings herein, it will also be understood that a transparent or translucent structural reinforcing element, like the structural plug 906, may be used to reinforce any portion of a light-transmissive display pattern, such as an indicator or logo area, of the present invention, whether or not a cavity such as the cavity 802 is present. This could be advantageous, for example, for a large logo wherein such a large number of the holes 704 would be formed that the structural integrity of the area would be reduced even in the absence of the cavity 802.

Figure 10:
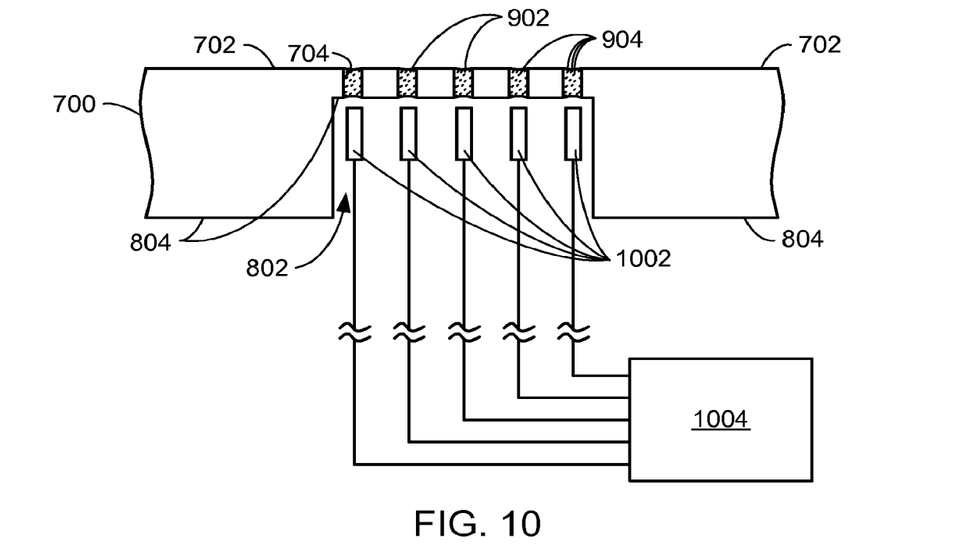
FIG. 10 is a view of a fragment structure similar to that in FIG. 9 but having individual lights for each of the holes.

Referring now to FIG. 10, therein is shown the structure of the fragment 700 in FIG. 9 provided with individual lights 1002, one for each of the holes 704, rather than the light 806 (FIG. 9) that was common to all the holes 704. The individual lights 1002 are depicted representationally, it being intended and understood that the individual lights 1002 may be provided in a medium that is either discrete or continuous according to the particular application and needs at hand. Thus the individual lights 1002 may be, for example, individual light-emitting diodes ("LEDs"), light sources from a discrete or continuous organic light-emitting diode ("OLED") structure, or other individual light sources or emitters in discrete or continuous media as appropriate.

The individual lights 1002 can be individually controlled, for example by a CPU 1004 or other suitable controller responding in known fashion to appropriate programming or user input. Thus, it is possible to pair the holes 704 with corresponding individual lights 1002 to form individually controllable pixels. When aggregated together, these individual hole-light pixels form a controllable and changeable display. In this manner, by matching the pixel pitch of the individual lights 1002 with the micro-perforated pattern of the holes 704, an invisible, programmable display can be made to appear through an apparently solid surface such as the opaque outer surface 702.

The individual lights 1002 are thus light sources that are configured and oriented behind the opaque outer surface 702 (metallic, plastic, coated, or otherwise) and are respectively aligned with the invisible holes 704. The holes 704 in this embodiment are invisible. The individual lights 1002 are then configured to controllably shine predetermined patterns of monochrome or multi-colored light through the invisible holes to cause the holes 704 to function as pixels to provide a controllable visual display through the seemingly solid surface. By virtue of the CPU 1004 (or other suitable mechanism) it is also possible to then choose and customize aesthetic and display motifs by selecting and controlling the light and light patterns that are displayed through the invisible holes 704.

It will now also be clear to one of ordinary skill in the art that these teachings may be combined as desired, such that, for example, a single or a limited number of monochrome or multi-colored light sources may be used to provide a visual display by shining the light through a selectively transmissive matrix. For example, the light may be shined through a liquid crystal display ("LCD") or a thin film transistor ("TFT") display having pixels aligned with respective individual invisible holes such as the holes 704.

Figure 11:
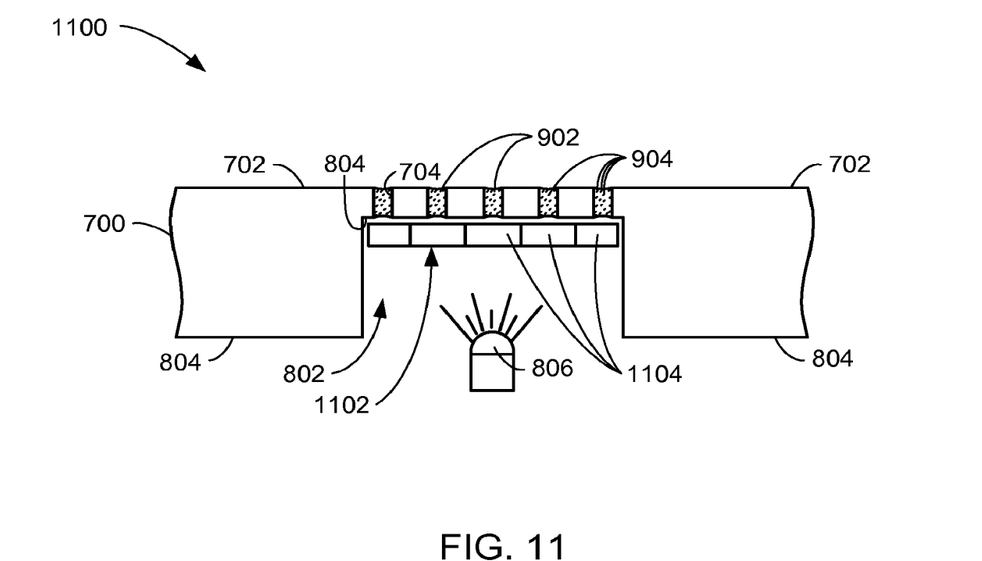
FIG. 11 is a view of a fragment structure having a TFT layer aligned with the individual holes.

Referring now to FIG. 11, therein is shown such a combined configuration 1100. In this embodiment, a light source 806 is positioned behind a TFT layer 1102. The individual pixels 1104 of the TFT layer 1102 are aligned with respective individual holes 704 to selectively and controllably shine predetermined patterns of monochrome or multi-colored light through the holes 704, as desired. From the perspective of the holes 704, each of the individual pixels 1104 is configured as a light source aligned with its respective corresponding hole 704. In the aggregate, therefore, patterns of monochrome or multicolored light can be controllably shined through the holes 704 to cause the holes 704 to function as pixels to provide a controllable visual display.

It will also now be clear that the holes 704 can be utilized bi-directionally for receiving light as well as transmitting it. Thus, for example, the individual lights 1002 (FIG. 10) or the TFT layer 1102, for example, may also be configured to detect as well as transmit light, or even just to detect light. Such light detectors may serve, for example, for receiving external control inputs for a processor, controller, or other device, such as the CPU 1004 (FIG. 10).

Figure 12:
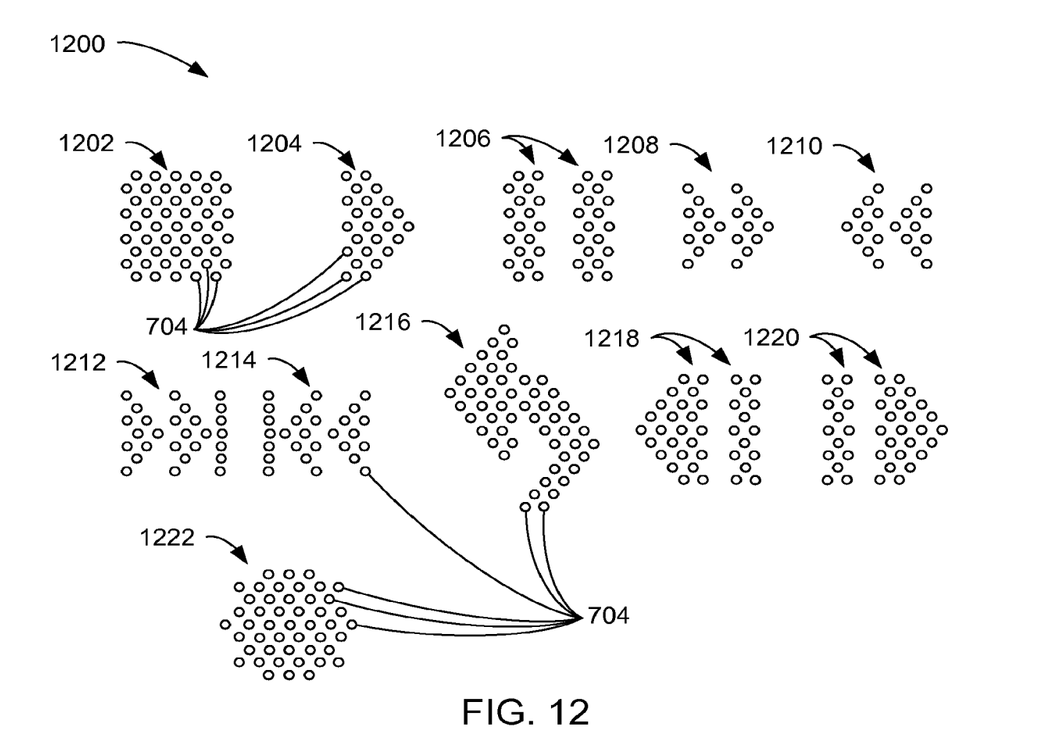
FIG. 12 is a view of several representative hole patterns.

Referring now to FIG. 12, therein are shown several representative hole patterns 1200 of the holes 704. For clarity of illustration, the holes 704 are shown greatly exaggerated in size, and for expository reasons, are shown generally much fewer in number than would be expected in a typical implementation. Thus, for instance, hole pattern 1202 forms a square, or "stop" indicator. Hole pattern 1204 forms a right-facing triangle, or "play" indicator. Hole pattern 1206 forms two vertical parallel lines, or a "pause" indicator. Hole pattern 1208 forms a double right pair of triangles, or a "fast forward" indicator. Hole pattern 1210 forms a double left pair of triangles, or a "rewind" indicator. Hole pattern 1212 forms a double right pair of triangles touching a vertical bar, or a "skip forward" indicator. Hole pattern 1214 forms a double left pair of triangles touching a vertical bar, or a "skip backward" indicator. Hole pattern 1216 forms an arrow reversing toward the left, or a "return" indicator. Hole pattern 1218 forms a left-facing triangle adjacent a vertical bar, or a "section backup" indicator. Hole pattern 1220 forms a right-facing triangle next to a vertical bar, or a "section forward" indicator. Hole pattern 1222 forms a round dot that is frequently used, for example, for an "on" or "enabled" indicator.

It has been unexpectedly discovered that the invisible, light-transmissive display system of the present invention provides exceptional versatility and choice in the presentation of displays. For example, in order to make the displays virtually invisible when the status indicators are in the off status, as illustrated for example in FIGS. 2B, 3B, and 4B, various surface effects and/or filler effects can be employed. That is, for example, with a smoothly polished (e.g., mirror finished) opaque outer surface 702 (such as illustrated in FIG. 6A), the presence of the holes 704 can sometimes be noticed because the holes will be slightly less reflective. The holes 704 will therefore cause such a polished surface to appear slightly duller where the holes are located even though the holes themselves are not visible.

One way to compensate for the slightly less reflective properties of the holes, according to the present invention, is to provide a textured rather than smoothly polished surface (as also illustrated in FIG. 7). The surface may be textured such as by burnishing, etching, sandblasting, anodizing, engraving, and so forth.

Another approach for disguising the presence of the holes, as taught herein, is to include particular particles 904 (FIG. 9) in the clear coat 902 in the holes 704. Such particles can be selected to reflect light in a complimentary manner to the opaque outer surface 702, thus diminishing the light-attenuating effects of the holes 704. For example, the particles 904 may be nano-particles formed of the same material as, or of a material similar in color and appearance to, the opaque outer surface 702. In this fashion, the particles 904 will tend to reflect light in a complimentary manner to the opaque outer surface 702, thereby diminishing the light-attenuating or light-changing effects of the holes 704 relative to the opaque outer surface 702.

Of course, based on these teachings, it will now be clear to one of ordinary skill in the art that these various solutions may be combined. For example, suspended nano-particles may be combined with textured surrounding surfaces to provide even greater camouflage for the presence of the invisible holes.

It has also been unexpectedly discovered that various surface effects, such as simulated etching, can be achieved by combining differently sized holes, different hole spacings, different fillers, different light sources, different surface finishes, and combinations of these, as desired. According to the desired effect, it will now be understood, therefore, that larger, visible holes may be employed along with the invisible holes to achieve unexpected, sometimes dramatic effects. These effects include, for example, smooth shading, gradual or abrupt changes in texture, and so on, as the mix of these variable features changes from one location to another. An example of one such complex combination of these effects is illustrated in FIGS. 6A and 6B.

Also, the hole patterns may be selectively illuminated in order to change the particular pattern that is presented at any given time. For example, the pattern 1220 (FIG. 12) may also be used to form the pattern 1204 by not illuminating the vertical bar in the pattern 1220. Similarly, the patterns 1212 and 1214 may be utilized in like manner to form, respectively, the patterns 1208 and 1210. In the same way, subsets of patterns similar to the patterns 1202 and 1222 can be used for forming other hole patterns such as, for example, the patterns 1204, 1206, and so forth.

The present invention also unexpectedly affords great versatility since it is highly adaptable to implementation by many existing technologies. For example, the invisible holes may be penetrated in the various light-transmissive display patterns through the opaque metallic, plastic, coated, or other light resistant material using one or more of laser drilling, laser machining, electron beam machining, electro-discharge machining ("EDM"), chemical milling, metal injection molding, conventional drilling, and a combination thereof, along with other suitable technologies as may be appropriate for the particular application at hand. Invisible holes that are formed thus will have the characteristics of the respective processes that were used to form them.

It will also be understood and appreciated by those of ordinary skill in the art, based on this disclosure, that the hole spacings and sizes, as suggested above, need not be as uniform as they are illustrated in the drawing FIGs. Variable spacings and sizes may be used to achieve effects, such as differences in texture, gradations in brightness, and so forth. It will also be understood that although the holes 704 are shown in FIGS. 8-10 as having uniformly cylindrical cross-sectional profiles, this is for illustrative purposes only, and that the holes in typical implementations will be expected to have the characteristic taper of the process that was used to form them. For example, laser-drilled holes often have a narrower or waisted portion toward the central longitudinal portion thereof, whereas holes formed by EDM tend to be very uniform in diameter.

Figure 13:
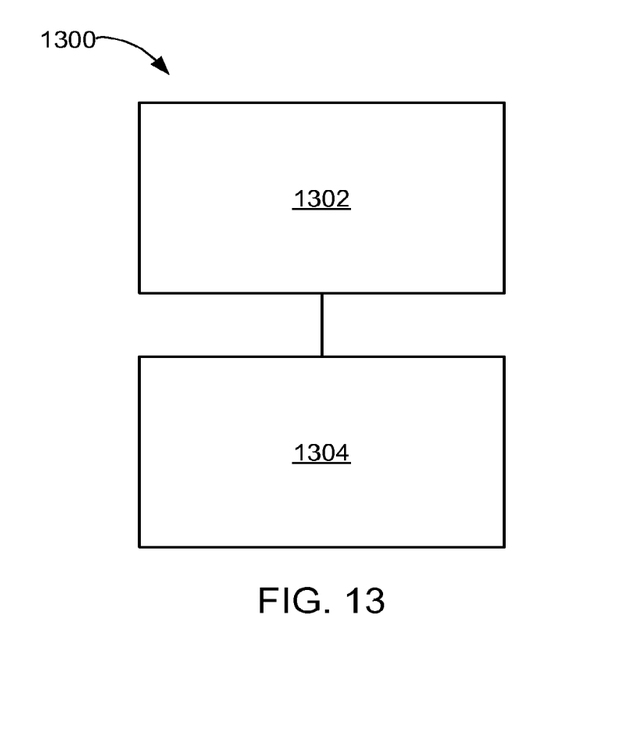
FIG. 13 is a flow chart of a process for manufacturing an invisible, light-transmissive display system in accordance with an embodiment of the present invention.

Referring now to FIG. 13, therein is shown a flow chart of a process 1300 for manufacturing an invisible, light-transmissive display system 1300 in accordance with an embodiment of the present invention. The process 1300 includes providing a light resistant material in a block 1302; and penetrating substantially invisible holes in a predetermined light-transmissive display pattern through at least a portion of the light resistant material in a block 1304.

It has been discovered that the present invention thus has numerous aspects.

A principle aspect that has been unexpectedly discovered is that the system of the present invention can economically and unobtrusively provide highly effective, aesthetically pleasing, and highly desirable surface displays that can be made invisible when not activated.

Another aspect is that the system of the present invention can provide for light emanation from an apparently solid, surface, with or without an intrinsic, visible design in that surface area.

Another important aspect is that the system of the present invention can be utilized with great success and effect with materials as described above that are not entirely opaque. Thus, invisible, light-transmissive display systems can be provided for viewing at an outer surface, not only of substantially opaque materials, but also of materials that are not opaque. A light resistant material that nevertheless allows some light to pass through, such as a translucent colored plastic, can furnish the basis for very dramatic display systems according to the present invention. Thus, in view of the teachings herein, it will now be clear to one of ordinary skill in the art that the invisible holes and systems according to the present invention, penetrated in a desired light-transmissive display pattern through at least a portion of light resistant material, will cause much brighter (and pleasingly unexpected) display patterns than if shined through materials that lack the present invention.

Another aspect is that the system of the present invention can be used for an extensive variety of desired displays, such as informational patterns, logos, control indication patterns, status indication patterns, directive patterns, artistic patterns, and so forth.

Yet another aspect is that the system of the present invention makes it possible to provide for and to enable the user to choose and thus customize aesthetic and display motifs according to individual preferences, by selecting and controlling the light and light patterns that are displayed through the invisible holes.

Another aspect is that the system of the present invention can provide selectable illumination through visible and otherwise apparently solid displays, designs, patterns, indicators, logos, and so forth.

Another aspect is that the system of the present invention can be used with virtually any kind of device needing or benefiting from an illuminated display configuration, such as computers, display panels, personal data assistants, personal music players, appliance instrumentation, vehicle instrumentation, a vehicle display, electronics instrumentation or display, jewelry, interactive kiosks, automated tellers, communication devices (such as cell phones, wired and wireless telephones, walkie-talkies, etc.), remote control devices, medical instruments or devices, training simulators, and so forth.

Another aspect is that the present invention allows displays to be provided in a fully metallic surface, thereby reducing vulnerability and improving the durability and robustness thereof.

Yet another important aspect of the system of the present invention is that it valuably supports and services the historical trend of reducing costs, simplifying systems, and increasing performance.

These and other valuable aspects of the present invention consequently further the state of the technology to at least the next level.

Thus, it has been discovered that the invisible, light-transmissive display system of the present invention furnishes important and heretofore unknown and unavailable solutions, capabilities, and functional aspects for display systems for electronic and other devices. The resulting configurations are straightforward, cost-effective, uncomplicated, aesthetically pleasing and attractive, highly versatile and effective, can be surprisingly and unobviously implemented by adapting known technologies, and are thus readily suited for efficiently and economically manufacturing highly desirable and appealing invisible display systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. An electronic device comprising:
    a housing having a top surface, a bottom surface, and a sidewall extending from the top surface to the bottom surface, wherein the sidewall comprises an opaque material with a plurality of openings; and
    a display in the housing, wherein the display is configured to display different patterns of light through the sidewall by using a plurality of light sources to selectively illuminate different subsets of openings in the plurality of openings.

2. The electronic device defined in claim 1, wherein the sidewall is configured to hide the display from view when the plurality of light sources are turned off.

3. The electronic device defined in claim 2, wherein the display is configured to indicate a status of the electronic device.

4. The electronic device defined in claim 3, further comprising a touch pad at the top surface.

5. The electronic device defined in claim 3, further comprising a button at the top surface.

6. The electronic device defined in claim 5, wherein the light comprises monochrome light.

7. The electronic device defined in claim 5, wherein the plurality of light sources comprise multi-colored light sources.

8. The electronic device defined in claim 5, further comprising:
an additional light source configured to emit light through the top surface.

9. The electronic device defined in claim 1, wherein the display is invisible from an exterior of the electronic device when the plurality of light sources are turned off.

10. A laptop computer comprising:
a first display;
a base housing hingedly coupled to the first display;
a keyboard at a wall of the base housing;
a second display at the wall of the base housing adjacent to the keyboard, wherein the second display comprises a plurality of light sources configured to emit light through a light-transmissive portion of the wall; and
a controller configured to control the plurality of light sources in the second display to selectively illuminate different patterns at the light-transmissive portion of the wall.

11. The laptop computer defined in claim 10, wherein the patterns comprise a status indicator indicative of a status of the laptop computer.

12. The laptop computer defined in claim 11, wherein the status indicator comprises a status indicator selected from the group consisting of:
a play indicator, a stop indicator, a pause indicator, a fast forward indicator, a rewind indicator, a skip forward indicator, a skip backward indicator, a return indicator, a section backup indicator, a section forward indicator, and an on indicator.

13. The laptop computer defined in claim 11, wherein the status indicator is configured to indicate a status of the laptop computer selected from the group consisting of: a wireless link status, a video camera status, a low battery status, a battery charging status, and a hard drive activity status.

14. The laptop computer defined in claim 11, wherein the plurality of light sources comprise multi-colored light sources.

15. The laptop computer defined in claim 10, wherein the wall comprises a metal wall.

16. The laptop computer defined in claim 10, wherein the controller is configured to control the plurality of light sources in the second display to illuminate a first pattern having a first shape at a first time and to illuminate a second pattern having a second shape at a second time subsequent to the first time, wherein a region of the light-transmissive portion of the wall that is illuminated as part of the first pattern is also illuminated as part of the second pattern.

17. A laptop computer comprising:
a display;
a base housing hingedly coupled to the display, wherein the base housing comprises a housing wall; and
a plurality of light sources in the base housing that are configured to illuminate a pattern of light through the housing wall in an on state and that are substantially invisible in an off state.

18. The laptop computer defined in claim 17, further comprising:
a controller configured to control the plurality of light sources to illuminate a plurality of different patterns through the housing wall.

19. The laptop computer defined in claim 17, wherein the housing wall comprises an opaque sheet having at least one opening, the plurality of light sources being configured to emit visible light through the at least one opening.

20. The laptop computer defined in claim 19, further comprising:
a light-transmissive structural reinforcement structure attached to the opaque sheet, aligned with the at least one opening, and configured to transmit the visible light.

* * * * *